UNITED STATES PATENT OFFICE.

FRANCIS L. STEWART, OF MURRYSVILLE, PENNSYLVANIA, ASSIGNOR OF ONE-HALF TO SAMUEL E. GILL, OF PITTSBURG, PENNSYLVANIA.

METHOD OF OBTAINING CELLULOSE.

No. 845,378. Specification of Letters Patent. Patented Feb. 26, 1907.

Application filed December 6, 1905. Serial No. 290,584.

*To all whom it may concern:*

Be it known that I, FRANCIS LAIRD STEWART, of Murrysville, Westmoreland county, Pennsylvania, have invented a new and useful Method of Obtaining Cellulose, of which the following is a full, clear, and exact description.

My invention relates to the manufacture of cellulose from vegetable fiber, and is especially applicable to its production from the "chip stuff" or stalk substance remaining from the stalk of maize or Indian corn after the saccharine juice has been obtained therefrom according to the invention set forth in my Patent No. 811,523, dated January 30, 1906. The invention is, however, applicable generally to the conversion into cellulose of grasses or other plants similar in physical structure to that of the maize plant.

The object of the invention is to provide a simple, rapid, and cheap method by which substantially chemically pure cellulose may be obtained from such materials.

In carrying out the method in its preferred form with the stalk of Indian corn the corn is subjected to the preliminary field treatment of the growing plant, which is set forth in my Patent No. 811,524, dated January 30, 1906. The sugar and other soluble matters are then extracted from the stalks, which are preferably chipped or shredded by pressure between the rolls of a cane-mill, assisted by maceration, diffusion, or other suitable step. The extraction of the soluble materials leaves as a residue the fibrous and cellular matter of the whole stalk in a finely divided and substantially pure condition. The mass at this time is freed from excess of moisture and is in an absorptive condition.

For making pure refined cellulose the stalk material prepared as above is fed into a retort or boiler capable of being closed and heated. This vessel may be heated by steam-jacket or in any other desirable way, and after the moist stalk material is fed in it is heated to a temperature of about 212° Fahrenheit, the cover is fastened down, and nitric oxide gas is injected through suitable pipe connection. At the same time a jet of live steam is injected through another pipe into the vessel or digester. The combined effect of these agents is to rapidly disorganize the chips and break up and resolve them into a form of cellulose. The amount of nitric oxid is preferably regulated, though an excess is not injurious to the product if the action is not unduly prolonged. The conversion of the whole mass is ordinarily accomplished in fifteen or twenty minutes, and enough of the nitric-oxid gas should be introduced with the steam to saturate the chips with a solution of the nitric oxid in water, which solution at the close of the operation should have a density near that of commercial nitric acid, or a specific gravity of about 1.4. After the conversion is made hot water is then admitted into the digester sufficient to cover the mass. This acid solution is then drawn off and may be tapped into a receptacle and treated with soda waste from the generating-retort and recovered as nitrate of sodium or nitrate of potassium, if nitrate has been used. After the mass has been washed with the hot water any excess of acid is neutralized with an alkaline substance. The mass is again washed and then preferably acidulated slightly with hydrochloric acid. It is then preferably washed free of acid, as indicated by the phenolphthalein test. Cellulose prepared in this manner is practically commercially pure and is adapted for all the uses in the arts in which a pure form of cellulose is desirable.

If that form of cellulose is desired which is usually known in paper-making as "half-stuff," the above method is not suitable unless the operation is closely watched and is stopped before the fibrous character of the mass is destroyed. This may be done, but would require sampling at short intervals of time. I find, however, that by the use of a substance which will retard or arrest the energetic action of the nitric oxid I can prepare half-stuff suitable for the manufacture of paper and similar uses by taking the waste-stalk material above described and moistening it in a digester or boiler with water or condensed steam, heating to the boiling-point of water and then subjecting to the action of the nitric-oxid gas, preferably in combination with chlorin gas. These gases are preferably injected into the mass by separate pipes and may be distributed through it by a mixer or by revolving or moving the digester. The chlorin and nitric oxid are preferably introduced in about equal volumes, and their action is assisted by heat until a sample taken from the mass shows that it has been sufficiently acted upon to be thoroughly disintegrated without seriously affecting the strength of the fibrous portions. The acid mixture is then drained off and the mass washed with water until it is no longer acidulous. It is then preferably bleached with a five to ten per cent. solution of chlorinated lime or chlorin and then slightly acidulated with sulfurous oxid or sulfurous acid or hydrochloric acid. It may then be washed and finally dried and compressed into sheets or molded into briquets or in any other desired form.

The advantages of my process result from the rapid and cheap conversion of the stalk material into cellulose. It will also be seen that by a slight variation of the process chemically-pure non-fibrous cellulose may be obtained for general use, or the fibrous half-stuff may be obtained for paper-making or similar uses.

As applied to the making of paper or similar material from cornstalks which have been subjected to the preliminary field treatment of the growing plant above mentioned, the method is of a special advantage for the reason that all of the stalk material is retained. In processes heretofore employed for this purpose it has been necessary to reject and remove the outer layers of hard silicious fiber. This fiber forms about one-half of the weight of the stalk, but must be thrown away on account of its resistance to chemical action. In addition, therefore, to the loss of this material the paper is weak and the expense of separating the softer inner portion from the outer layers is lost. In my process, on the contrary, all of the fiber is retained and the outer hard fibers furnish a material which will give a strong and excellent quality of paper. The process may be carried out at low cost and a large output obtained.

The method may be applied to vegetable stalks of the character described when in their natural condition, either while green or when the stalk is dried and dead. In such case, however, the result is less favorable as to the quality, quantity, and cost of the product, and I prefer to treat the material after it has been freed from its water-soluble matters in accordance with my patents.

Changes may be made in the form of treatment of the stalk material, the process may be applied to any grass or plants of the same general physical character as the stalk of Indian corn, and many other variations may be made without departing from my invention.

I claim—

1. The method of obtaining cellulose from the stalks of maize and similar vegetable-stalk material, which consists in treating the same with nitric oxid and steam; substantially as described.

2. The method of obtaining cellulose from the stalks of maize and similar vegetable-stalk material, which consists in treating said material with nitric oxid, in the presence of water vapor; substantially as described.

3. The method of making cellulose, which consists in treating the stalks of maize, and similar stalk material, with nitric oxid and steam, and then washing the mass; substantially as described.

4. The method of making cellulose, which consists in treating the stalks of maize, and similar stalk material, with nitric oxid and steam, then washing the mass and then neutralizing and washing it; substantially as described.

5. The method of making cellulose from the stalks of maize and similar plants, which consists in removing the sugar and water-soluble materials from said stalks, and then treating the stalk material with nitric oxid and steam; substantially as described.

6. The method of making cellulose from the stalks of maize and similar plants, which consists in treating the stalk material with nitric oxid and chlorin in the presence of water vapor; substantially as described.

7. The method of making cellulose from the stalks of maize and similar plants, which consists in treating the stalk material with nitric oxid and chlorin in the presence of water vapor and then washing the mass; substantially as described.

8. The method of making cellulose, which consists in removing the water-soluble materials from the stalks of maize and similar plants, leaving the stalk material in a divided absorptive condition, and then treating such material, while moist, with nitric oxid and chlorin; substantially as described.

In testimony whereof I have hereunto set my hand.

FRANCIS L. STEWART.

Witnesses:
G. B. BLEMING,
H. M. CORWIN.